United States Patent
Chen et al.

(10) Patent No.: US 9,438,812 B2
(45) Date of Patent: Sep. 6, 2016

(54) METHOD FOR CONTROLLING EXPOSURE LEVEL OF FRAME IN IMAGE SENSOR, COMPUTER READABLE RECORDING MEDIA FOR PERFORMING THE METHOD, AND IMAGE PROCESSING SYSTEM

(71) Applicant: Himax Imaging Limited, Tainan (TW)

(72) Inventors: Po-Fang Chen, Tainan (TW); Po-Chang Chen, Tainan (TW); Yuan-Chih Peng, Tainan (TW)

(73) Assignee: Himax Imaging Limited, Tainan (TW)

( * ) Notice: Subject to any disclaimer, the term of this patent is extended or adjusted under 35 U.S.C. 154(b) by 111 days.

(21) Appl. No.: 14/332,320

(22) Filed: Jul. 15, 2014

(65) Prior Publication Data
US 2016/0021289 A1    Jan. 21, 2016

(51) Int. Cl.
| H04N 5/235 | (2006.01) |
| H04N 5/353 | (2011.01) |
| H04N 5/243 | (2006.01) |
| H04N 5/355 | (2011.01) |
| H04N 5/378 | (2011.01) |

(52) U.S. Cl.
CPC .......... *H04N 5/2352* (2013.01); *H04N 5/2356* (2013.01); *H04N 5/243* (2013.01); *H04N 5/3535* (2013.01); *H04N 5/35554* (2013.01); *H04N 5/378* (2013.01)

(58) Field of Classification Search
CPC .. H04N 3/1556; H04N 5/243; H04N 5/2352; H04N 5/2353; H04N 5/2356; H04N 5/3535; H04N 5/35554
USPC .................. 348/222.1, 229.1, 297, 362, 364
See application file for complete search history.

(56) References Cited

U.S. PATENT DOCUMENTS

| 6,137,533 A * | 10/2000 | Azim | H04N 5/243 348/222.1 |
| 6,567,123 B1 * | 5/2003 | Hashimoto | H04N 5/217 348/223.1 |
| 7,526,194 B2 * | 4/2009 | Kim | H04N 5/2351 348/208.12 |
| 8,081,236 B2 * | 12/2011 | Tsuruoka | H04N 5/235 348/221.1 |
| 9,077,911 B2 * | 7/2015 | Jannard | H04N 5/235 |
| 9,167,169 B1 * | 10/2015 | Rivard | H04N 5/2355 |
| 9,294,687 B2 * | 3/2016 | Nikkanen | H04N 5/353 |
| 2010/0141792 A1 * | 6/2010 | Arai | H04N 5/23248 348/229.1 |
| 2013/0193309 A1 * | 8/2013 | Nakata | H01L 27/14601 250/208.1 |
| 2015/0195441 A1 * | 7/2015 | Chen | G06T 5/009 348/362 |

\* cited by examiner

*Primary Examiner* — Ngoc-Yen Vu
(74) *Attorney, Agent, or Firm* — Winston Hsu; Scott Margo (57) ABSTRACT

A method for controlling a frame exposure level, comprising: (a) determining a second integration time for the pixel array via a desired exposure level, and determining a second analog gain and a second digital gain via a desired total gain; (b) respectively applying the second analog gain and the second digital gain to amplify at least one second light sensing signal and at least one digital light sensing signal generated from the second light sensing signal; (c) computing a desired total gain for the third frame, and determining a third analog gain and a third digital gain via the desired total gain; and (d) respectively applying the third analog gain and the third digital gain to amplify at least one third light sensing signal and at least one digital light sensing signal generated from the third light sensing signal, and applying the second integration time to the pixel array.

21 Claims, 6 Drawing Sheets

FIG. 1 PRIOR ART

Apply : apply exposure parameters in the image sensor

Update : update exposure parameters by control unit

METHOD FOR CONTROLLING EXPOSURE LEVEL OF FRAME IN IMAGE SENSOR, COMPUTER READABLE RECORDING MEDIA FOR PERFORMING THE METHOD, AND IMAGE PROCESSING SYSTEM

BACKGROUND OF THE INVENTION

1. Field of the Invention

The present invention relates to a method for controlling an exposure level of a frame, a computer readable recording media for performing the method and an image processing system applying the method, and particularly relates to a method for controlling an exposure level via adjusting the integration time, the analog gain and the digital gain for each frame, a computer readable recording media for performing the method and an image processing system applying the method.

2. Description of the Prior Art

Figure 1:
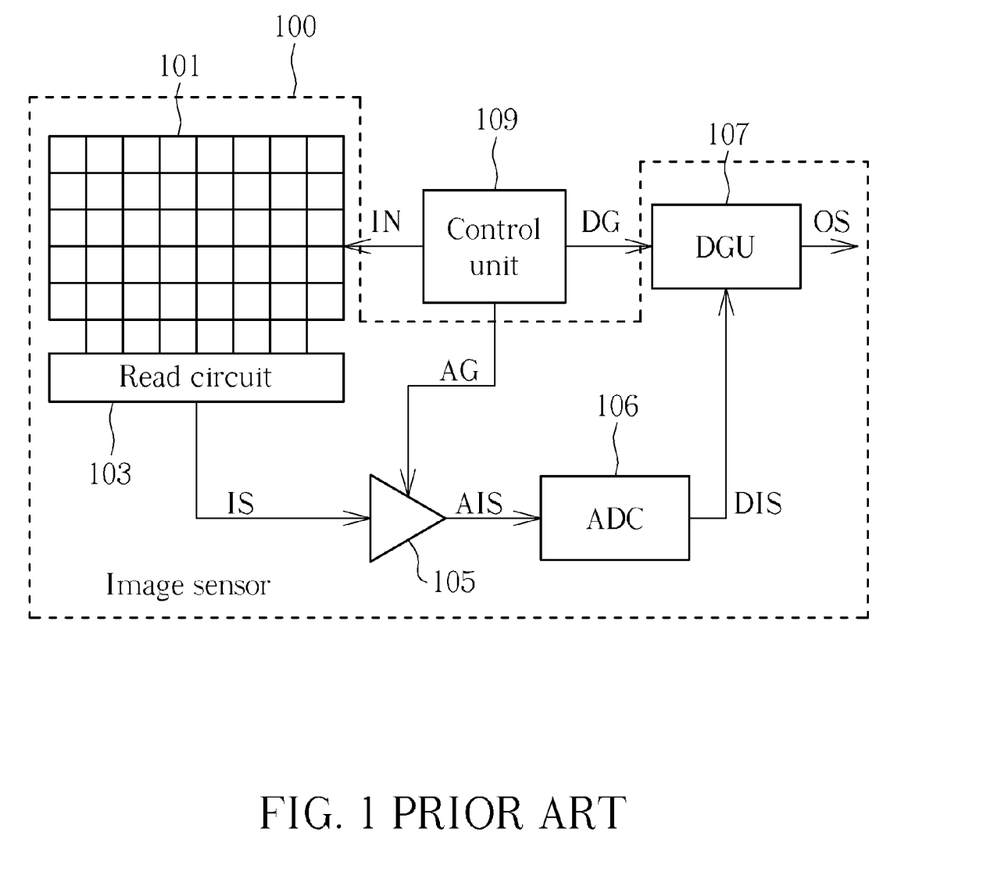
FIG. 1 is a circuit diagram illustrating a conventional image sensor.

FIG. 1 is a circuit diagram illustrating a conventional image sensor 100. As shown in FIG. 1, the image sensor 100, which generates an output image signal OS to a display, comprises a pixel array 101, a read circuit 103, an analog amplifier 105, an analog to digital converter 106, and a digital gain unit 107. The pixel array 101 senses light to generate at least one light sensing signal and the read circuit 103 reads and outputs the light sensing signal IS, which is an analog signal. If a frame is read from the pixel array 101, a plurality of light sensing signals IS corresponding to the frame are generated and read from the pixel array 101.

The analog amplifier 105 amplifies the light sensing signal IS to generate an amplified image sensing signal AIS. The analog to digital converter 106 converts the amplified image sensing signal AIS to a digital image sensing signal DIS. The control unit 109 controls the operations for the pixel array 101, the analog amplifier 105 and the digital gain unit 107 via exposure parameters comprising: an integration time IN, an analog gain AG and a digital gain DG. Please note the term "amplify" in this application is not limited to amplify via a gain which is larger than 1. The term "amplify" in this application can indicate amplify via a gain which is smaller than 1.

For more detail, the control unit 109 contains a statistics module and an exposure decision module, which can be software, firmware or hardware. The statistics module computes a mean or a weighted mean from the mean values of color channels of a frame. If the calculated mean is not within a convergent zone, the exposure decision module will compare the calculated mean with a given target mean value, and then decide a new desired exposure level. Based on the new desired exposure level, new exposure parameters will be decided. That is, a new integration time IN, a new analog gain AG and a new digital gain DG will be decided.

The analog gain AG indicates the gain of the analog amplifier 105, and the digital gain DG indicates the gain of the digital gain unit 107. The definition of the integration time IN under a rolling shutter structure is as follows: To start a new frame, each row is reset in sequence by a reset signal. After the decided integration time is over, each row is read in sequence by a read signal. After the whole frame (or a part of rows) is read, the statistics module will calculate a mean of the frame, and then the exposure decision module will decide a new integration time, a new analog gain, and a new digital gain. The control unit 109 then applies these exposure parameters to the image sensor 100.

For a conventional image sensor, the new integration time, the analog gain and the new digital gain are concurrently applied to the same frame after they are updated. However, a time delay issue may occur while applying these exposure parameters to generate a new frame. For example, if a frame n is read and the new exposure parameters are decided, the frame n+1 has already started to expose. So after the new parameters are updated, the new integration time can only be applied to frame n+2. Here the operation "update" indicates the new exposure parameters are generated by the control unit and the control unit generates a command to the image sensor, and the operation "apply" indicates the image sensor applies the new exposure parameters to a new frame according to the command from the control unit. Additionally, the image sensor may not apply the new exposure parameters immediately after receiving the new exposure parameters.

Since there is a timing delay issue between the exposure parameters updating by a control unit and the frame generation according to the exposure parameters by an image sensor, a skip control module is used to control the timing. To ensure that each time the new integration time, the new analog gain and the new digital gain are all applied to the same frame, the skip control module restricts the exposure decision module to update the exposure parameters only for some frames. Or, the skip control module restricts the exposure decision module to update only for some frames to slow the updating rate.

Figure 2:
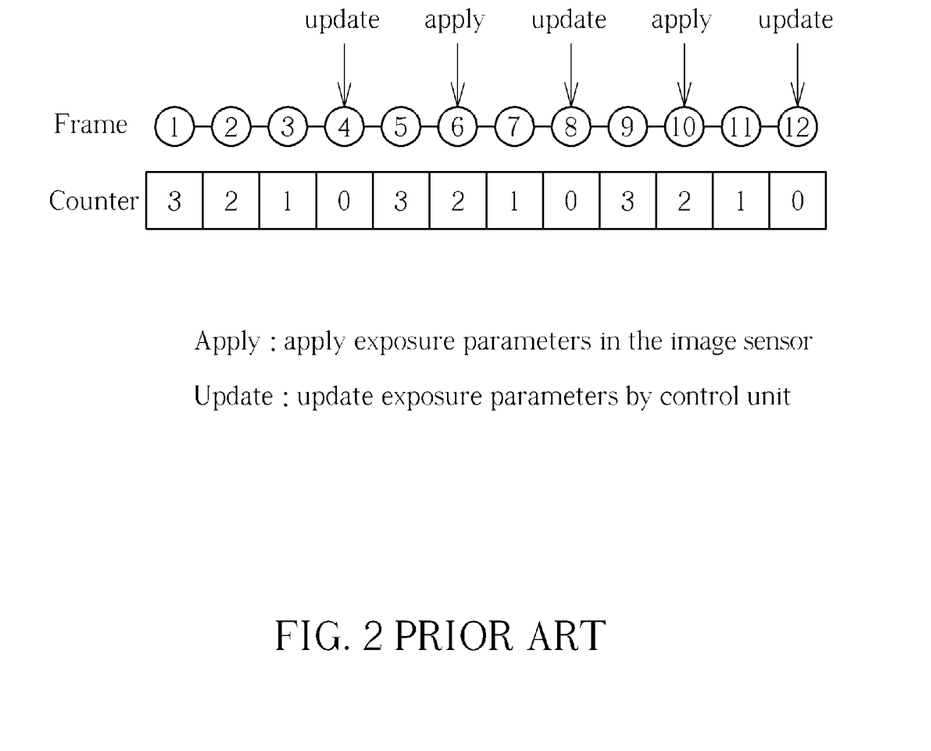
FIG. 2 is a schematic diagram illustrating a frame skip operation for a conventional image sensor.

FIG. 2 is a schematic diagram illustrating an example of frame skip operation for a conventional image sensor. In this example, 3 frames are skipped. That is, once the control unit updates the new exposure parameters, three frames are skipped before the next new exposure parameters are updated. As shown in FIG. 2, a counter value decreases if a frame is generated by the image sensor. However, in this case, the exposure parameters are only updated for a frame corresponding to the counter value 0. Also, the frame corresponding to the counter value 2 applies the new exposure parameters due to the time delay issue. In other examples, the delay time between the updating operation and the applying operation is an integer and more than one frame.

However, such technique may causes a non-smooth brightness change since the exposure parameters are not updated for each frame. Additionally, the convergence for such technique is slow since only exposure parameters for a few frames are updated.

SUMMARY OF THE INVENTION

Therefore one embodiment of the present invention is to provide a method for updating the analog gain/the digital gain for each frame.

One embodiment of the present invention discloses a method for controlling an exposure level of a frame, applied to an image sensor. The image sensor comprises a pixel array, an amplifier and a digital gain unit. The pixel array generates at least one first light sensing signal from a first frame according to a first integration time. The amplifier amplifies the first light sensing signal according to a first analog gain, and the digital gain unit amplifies at least one digital light sensing signal generated according to the first light sensing signal according to a first digital gain. The method comprises: (a) computing a desired exposure level for a second frame following the first frame, and determining a second integration time for the pixel array via the desired exposure level, and computing a desired total gain for the second frame via comparing the desired exposure level with the first integration time, and determining a second analog gain for the amplifier and a second digital gain for the digital gain unit via the desired total gain; (b) applying the second analog gain to the amplifier to amplify at least one second light sensing signal from the second frame, applying the second digital gain to the digital gain unit to amplify at least one digital light sensing signal generated from the second light sensing signal, wherein the pixel array generates the second light sensing signal according to the first integration time; (c) computing a desired exposure level for a third frame following the second frame for N frames, and computing a desired total gain for the third frame via comparing the desired exposure level with the second integration time, and determining a third analog gain and a third digital gain via the desired total gain; and (d) applying the third analog gain to the amplifier to amplify at least one third light sensing signal from the third frame, applying the third digital gain to the digital gain unit to amplify at least one digital light sensing signal generated from the third light sensing signal, and applying the second integration time to the pixel array to generate the third light sensing signal from the third frame. The N is a positive integer.

The above-mentioned methods can be performed via executing at least one program stored in a computer readable recoding media.

In one embodiment, the above-mentioned steps are periodically performed.

The above-mentioned exposure level corresponds to a product of an integration time, an analog gain and a digital gain. Also, the above-mentioned desired exposure level can be determined by many methods, for example, desired exposure level$_{N+1}$=exposure level$_N$ * (target mean/mean$_N$). In such case, the brightness of the frame$_{N+1}$ can be adjusted to the target brightness via adjusting the exposure parameters$_{N+1}$ for frame$_{N+1}$ according to the desired exposure level $_{N+1}$. The desired exposure level$_{N+1}$ is the desired exposure level for the frame N+1, the exposure level$_N$ is the exposure level of the frame N, and the mean$_N$ is the mean of the frame N. Frame N+1 is a frame following the frame N. Take FIG. 3 for example, frame 3 is the frame N+1 while the frame 2 is the frame N.

In view of above-mentioned embodiments, the analog gain/digital gains are computed for each frame. Furthermore, the integration time can also be computed for each frame if desired. Thus, the issue for the prior art can be solved. Moreover, the variation of the analog gain/digital gain can be reduced since a total gain check operation is performed. By this way, a gain oscillation problem can be avoided.

Another embodiment of the present invention discloses An image processing system, comprising a control unit and an image sensor. The image sensor comprises: a pixel array, for generating at least one first light sensing signal from a first frame according to a first integration time; an amplifier, for amplifying the first light sensing signal according to a first analog gain; and a digital gain unit, for amplifying at least one digital light sensing signal generated according to the first light sensing signal according to a first digital gain. The control unit performs the following steps: (a) computing a desired exposure level for a second frame following the first frame, and determining a second integration time for the pixel array via the desired exposure level, and computing a desired total gain for the second frame via comparing the desired exposure level with the first integration time, and determining a second analog gain for the amplifier and a second digital gain for the digital gain unit via the desired total gain; (b) applying the second analog gain to the amplifier to amplify at least one second light sensing signal from the second frame, applying the second digital gain to the digital gain unit to amplify at least one digital light sensing signal generated from the second light sensing signal, wherein the pixel array generates the second light sensing signal according to the first integration time; (c) computing a desired exposure level for a third frame following the second frame for N frames, and computing a desired total gain for the third frame via comparing the desired exposure level with the second integration time, and determining a third analog gain and a third digital gain via the desired total gain; and (d) applying the third analog gain to the amplifier to amplify at least one third light sensing signal from the third frame, applying the third digital gain to the digital gain unit to amplify at least one digital light sensing signal generated from the third light sensing signal, and applying the second integration time to the pixel array to generate the third light sensing signal from the third frame. The N is a positive integer.

In one embodiment, the above-mentioned image processing system can be implemented in a silicon die. However, the above-mentioned image processing system can be implemented in other electronic devices as well.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
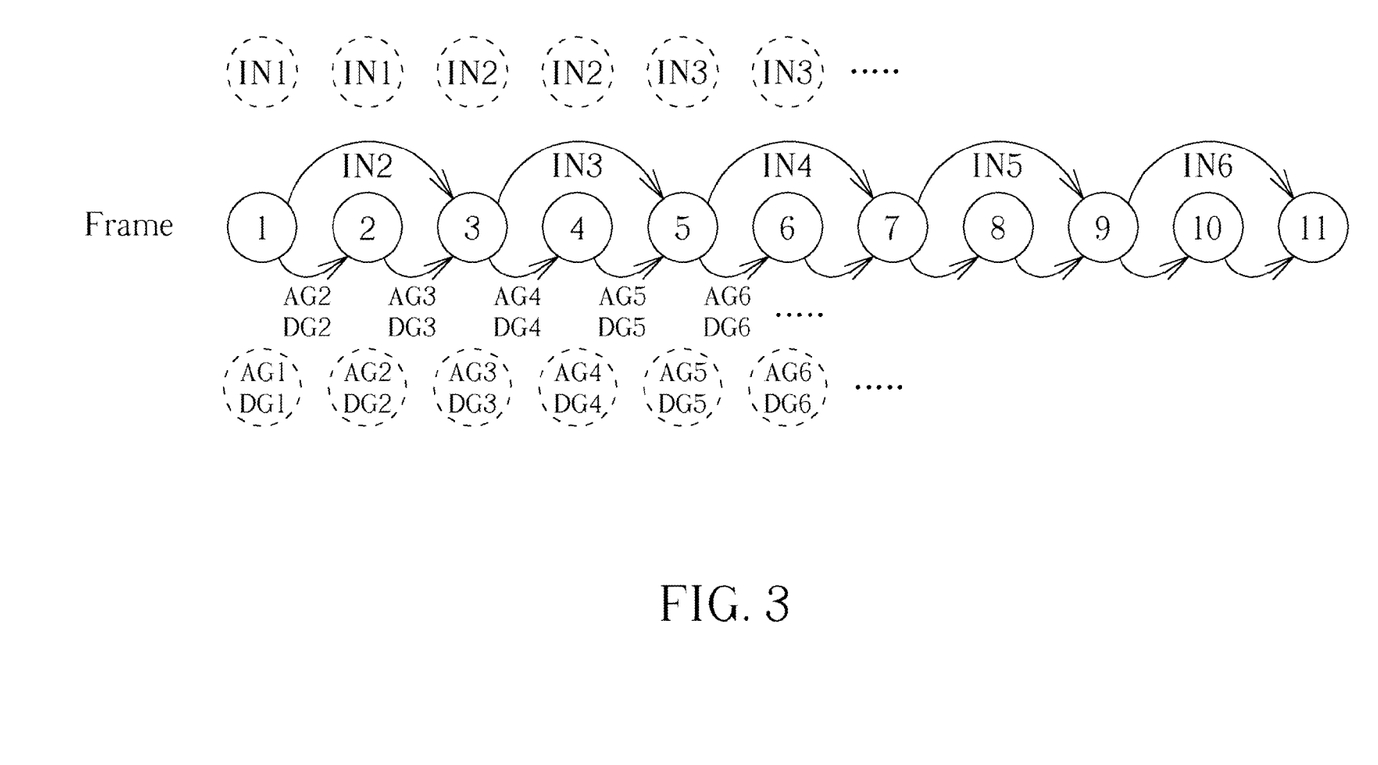
FIG. 3 is a schematic diagram illustrating a method for controlling an exposure level of a frame, according to one embodiment of the present invention.

FIG. 3 is a schematic diagram illustrating a method for controlling an exposure level of a frame, according to one embodiment of the present invention. As shown in FIG. 3, the analog gain (AG1, AG2, AG3, AG4 . . . ) and the digital gain (DG1, DG2, DG3, DG4 . . . ) are updated for each frame. Therefore, frame 1 applies the analog gain AG1, and applies the digital gain DG1. The analog gain AG2 and the digital gain DG2 are decided based on frame 1, and are applied to frame 2. The analog gain/digital gain updating and applying operations are the same for following frames, thus are omitted for brevity here.

In the embodiment of FIG. 3, the integration time is only updated for apart of the frames. In this embodiment, a frame is skipped while applying the integration time. Therefore, frame 1 applies the integration time IN1 and a new integration time IN2 is decided based on frame 1. Frame 2 still applies the integration time IN1, but frame applies the new integration time IN2. The integration time updating/applying operations are the same for the following frames, thus are omitted for brevity here.

Therefore, the operation in FIG. 3 can be summarized as follows: a method for controlling an exposure level of a frame, applied to an image sensor, wherein the image sensor (ex. the image sensor 100 in FIG. 1, but not limited) comprises a pixel array, an amplifier and a digital gain unit, wherein the pixel array generates at least one first light sensing signal from a first frame according to a first integration time (ex. IN1), where the amplifier amplifies the first light sensing signal according to a first analog gain (ex. AG1), and the digital gain unit amplifies a digital light sensing signal generated according to the first light sensing signal according to a first digital gain (ex.DG1).

The method comprises: (a) computing a desired exposure level for a second frame(ex. frame 2 in FIG. 3) following the first frame, and determining a second integration time (ex. IN2) for the pixel array via the desired exposure level, and computing a desired total gain for the second frame via comparing the desired exposure level with the first integration time, and determining a second analog gain (ex. AG2) for the amplifier and a second digital gain (ex. DG2)for the digital gain unit via the desired total gain; (b)applying the second analog gain (ex. AG2)to the amplifier to amplify at least one second light sensing signal from the second frame, applying the second digital gain (ex. DG2) to the digital gain unit to amplify at least one digital light sensing signal generated from the second light sensing signal, wherein the pixel array generates the second light sensing signal according to the first integration time (ex. IN1); (c) computing a desired exposure level for a third frame(ex. frame 3 in FIG. 3) following the second frame for N frames (N≥1), and computing a desired total gain for the third frame via comparing the desired exposure level with the second integration time (ex. IN2), and determining a third analog gain (ex. AG3) and a third digital gain (ex.DG3) via the desired total gain; and (d)applying the third analog gain(ex.AG3) to the amplifier to amplify at least one third light sensing signal from the third frame, applying the third digital gain (ex. DG3) to the digital gain unit to amplify at least one digital light sensing signal generated from the third light sensing signal, and applying the second integration time(ex. IN2) to the pixel array to generate the third light sensing signal from the third frame.

In one embodiment, the pixel array generates the light sensing signal according to light from a light source (ex. a fluorescent light), and the integration time is based on an alternating period of the light source. The light source receives alternating current voltage (AC voltage) to generate light, thus the light changes corresponding to the voltage of the AC voltage. The alternating period indicates the light changing period. In one embodiment, the integration time is M*alternating period, wherein M is a positive integer.

Figure 4:
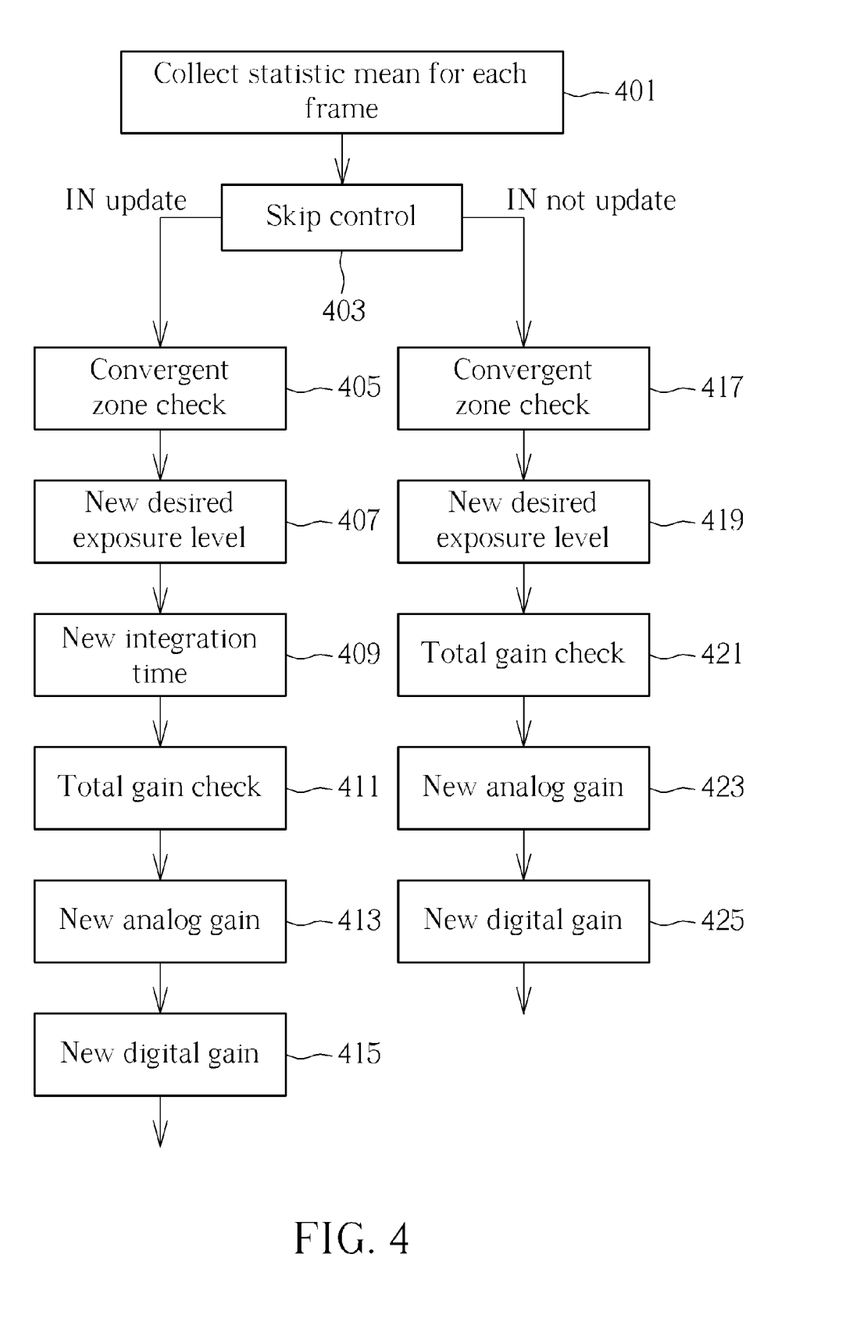
FIG. 4 is a flow chart illustrating detail steps for the method for controlling an exposure level of a frame, according to the embodiment described in FIG. 3.

FIG. 4 is a flow chart illustrating detail steps for the method for controlling an exposure level of a frame, according to the embodiment described in FIG. 3. FIG. 4 comprises the following steps:

Step 401

Collect statistic mean for each frame.

Many methods can be applied to calculate the mean. For example, pixels values for apart or a whole frame can be summed and an average thereof is calculated. Alternatively, a frame can be separated for several blocks, and each block is set a weight value. The pixel values for each block are multiplied with a weighted value to generate a plurality of weighted pixel values, and these weighted pixel values are summed and an average thereof is calculated.

Step 403

Skip control. That is, control the new integration time is generated or not (i.e. the integration time is updated or not). If the new integration time is generated (such as the frame 1 and the frame 3 in FIG. 3), perform the steps 405-415. Also, if the new integration time is not generated (such as the frame 2 and the frame 4 in FIG. 3), perform the steps 417-425.

In one embodiment, a counter can be applied for the skip control.

Step 405

Check if the mean is within the convergent zone. If not, the steps 407-415 are performed. If yes, the new integration time, the new analog gain and the new digital gain may not be generated.

Step 407

Calculate a new desired exposure level.

In one embodiment, the new desired exposure level for a frame N+1=M * the exposure level of a frame N. The parameter M, which is a positive real number, can be determined by comparing the given target mean with the mean of the frame N. For example, M=target mean/the mean of the frame N. The frame N+1 is a frame following the frame N. Take FIG. 3 for example, frame 4 is the frame N+1 if frame 3 is the frame N.

Step 409

Decide a new integration time according to the new desired exposure level.

The new integration time will be applied to at least one later frame, but not limited to the frame N+1.

Many methods can be applied to determine the integration time. In one embodiment, the integration time is determined prior to the analog gain and the digital gain. Also, if the light source receives the alternating current and periodically changes corresponding to the alternating current, the integration time can be M*alternating period, as above-mentioned. In some applications, if the minimum frame rate is specified in advance, the integration time should be shorter than the time period defined by the frame rate.

Step 411

Compute a new desired total gain and perform a total gain check operation to adjust the new desired total gain. The total gain check operation is performed to avoid gain oscillation.

In one embodiment, the new desired total gain for the frame N+1=the new desired exposure level for the frame N+1/the integration time for the frame N+1. The new desired exposure level for the frame N+1 is decided at step 407.

Step 413

Decide a new analog gain.

The new analog gain can be determined by the new desired total gain. As above-mentioned, the new desired total gain=new analog gain * new digital gain. In one embodiment, the new analog gain is determined prior to the new digital gain.

Step 415

Decide a new digital gain.

In one embodiment, the new digital gain=the new desired total gain/the new analog gain.

Step 417

Check if the mean is within the convergent zone. If not, the steps 419-425 are performed. If yes, the new integration time, the new analog gain and the new digital gain may not be generated.

Step 419

Calculate a new desired exposure level.

In one embodiment, the new desired exposure level for a frame N+1=M * the exposure level of a frame N. The parameter M, which is a positive real number, can be determined by comparing the given target mean with the mean of the frame N. For example, M=target mean/the mean of the frame N. The frame N+1 is a frame following the frame N. Take FIG. 3 for example, frame 3 is the frame N+1 if frame 2 is the frame N.

Step 421

Compute a new desired total gain and perform a total gain check operation to adjust the new desired total gain. The total gain check operation is performed to avoid gain oscillation.

In one embodiment, the new desired total gain for the frame N+1=the new desired exposure level for the frame N+1/the integration time for the frame N+1. The new desired exposure level for the frame N+1 is decided at step 419.

Step 423

Decide a new analog gain.

The new analog gain can be determined by the new desired total gain. As above-mentioned, the new desired total gain=new analog gain * new digital gain. In one embodiment, the new analog gain is determined prior to the new digital gain.

Step 425

Decide a new digital gain.

In one embodiment, the new digital gain=the new desired total gain/the new analog gain.

Regarding to the step 411 and the step 421, a total gain check operation is applied for avoiding gain oscillation. Gain oscillation indicates the variation between each gain have an opposite direction and is larger than a predetermined range. For example, a first total gain TG1, a second total gain TG2 and a third total gain TG3, which correspond to different frames, are respectively 1X, 3X, 1.2X. In such case, TG2/TG1 is 3 and TG2/TG3 is 2.5, which are both larger than a predetermined range (ex. 2X). For another example, a first gain TG1, a second gain TG2 and a third gain TG3, which correspond to different frames, are respectively 5X, 2X, 6X. In such case, TG1/TG2 is 2.5 and TG3/TG2 is 3, which are both larger than a predetermined range (ex. 2X). Such cases can indicate that the gain oscillation occurs, but not limited.

When the integration time reaches its maximum, the total gain may go larger than 2X to keep image brightness. If the desired next total gain is larger than 2X and the next integration time is smaller than the max integration time, the gain oscillation may happen. The gain oscillation can lead to visible noise level change. In such situation, we can use a total gain check operation to examine the value of the total gain. Please note the 2X here can be replaced by other threshold, for example, nX (n is a positive real number). However, the total gain check operation is not limited to be performed under the situation that the operation for detecting gain oscillation exists. The total gain check operation can be performed without detecting the gain oscillation.

The total gain check operation limits the variance of the total gain between two adjacent frames (ex. frame 1/frame 2 in FIG. 3). For example, presume the total gain of a frame N is 1.5X, and the desired total gain for the frame N+1 (which is the next frame of the frame N) is 6X. If the tolerant variance is 2X, then the allowable total gain for the frame N+1 will be 1.5 * 2=3X, and the total gain to be applied will be thus limited to 3X. By this way, the variation of the analog gain and the digital gain is smoother.

In another embodiment, this step pre-calculates the total gain of a future frame as a prediction. If the pre-calculated total gain is larger than the desired total gain, there is no problem. If the pre-calculated total gain is smaller than the desired total gain, then we limit the desired total gain to be applied in a determined range.

The total gain check operation can be performed to different combinations for the frames. For example, for the frame 2 and the frame 3 in FIG. 3, which means the integration time for a next frame is changed. Alternatively, for the frame 3 and the frame 4 in FIG. 3, which means the integration time for a next frame is not changed.

For the case of frame 2 and frame 3, the step 421 can comprise the following steps: computing the second total gain according to the second analog gain and the second digital gain (i.e. frame 2); computing a desired total gain for the frame 3 according to the desired exposure level for the frame 3 and the second integration time (IN2, which will be applied to frame 3); performing a total gain check operation to adjust the desired total gain according to a difference or a ratio between the second total gain and the desired total gain; and deciding the third analog gain and the third digital gain according to the desired total gain.

In one embodiment, the total gain check operation is performed if the desired total gain increases for the next frame. For example, if a desired total gain for the above-mentioned frame 3 is larger than the second total gain of the above-mentioned frame 2, the total gain check operation is performed. On the contrary, if a desired total gain for the frame 3 is smaller than the second total gain of the frame 2, the total gain check operation is not performed.

For the case of frame 3 and frame 4, the step 411 can comprise the following steps: computing the third total gain according to the third analog gain and the third digital gain (i.e. frame 3); computing a desired total gain for the frame 4 according to the desired exposure level for the frame 4 and the second integration time (IN2, which will be applied to the frame 4); performing a total gain check operation to adjust the desired total gain according to a difference or a ratio between the third total gain and the desired total gain; and deciding the fourth analog gain and the fourth digital gain according to the desired total gain.

However, please note that the step 411 and step 421 can be removed if the variation of the analog gain and the digital gain is not seriously concerned. Or, if a frame rate of the frames is high, the gain oscillation may not be visibly obvious by a user such that the total gain check operation can be disabled. Therefore, in one embodiment, a decision step for deciding whether the total gain check operation is enabled or not based on a frame rate is provided. In such case, if the frame rate is higher than a predetermined threshold, the total gain check operation is not performed. On the contrary, if the frame rate is lower than the predetermined threshold, the total gain check operation is performed.

Figure 5:
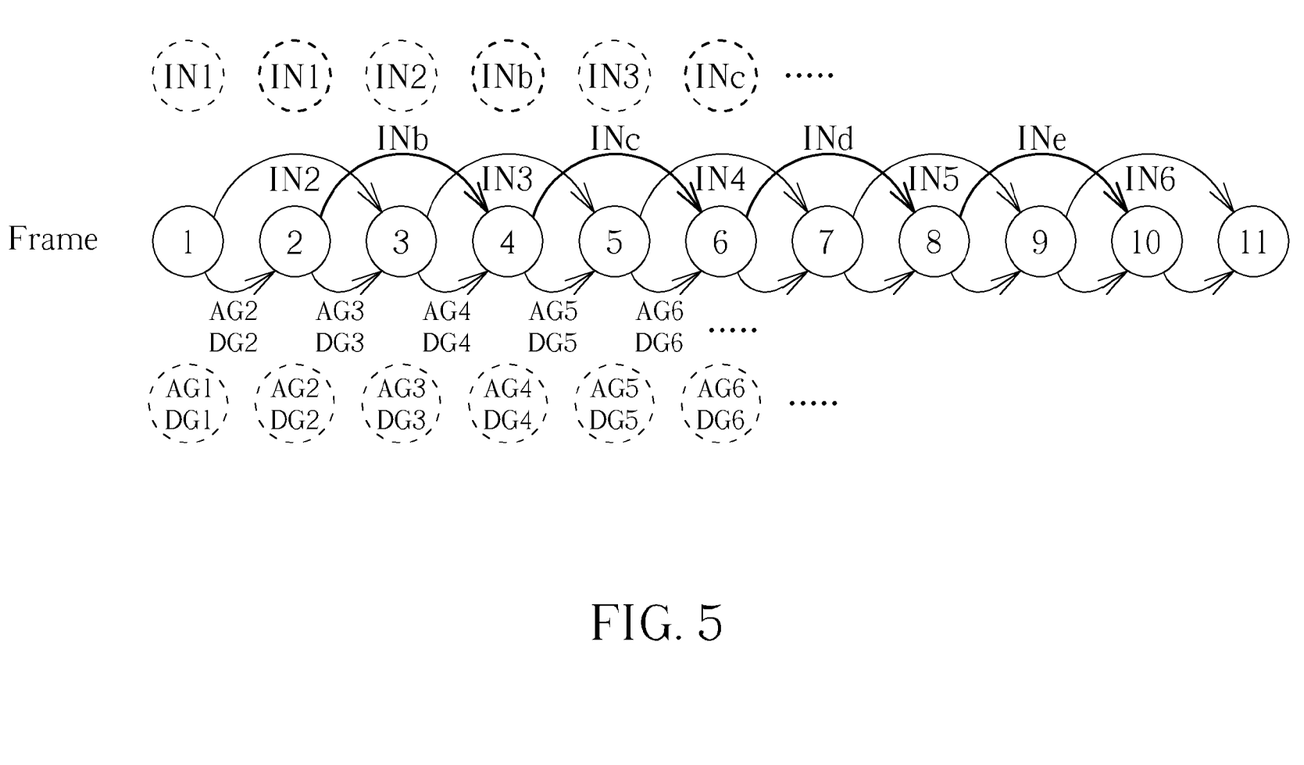
FIG. 5 is a schematic diagram illustrating a method for controlling an exposure level of a frame, according to another embodiment of the present invention.

FIG. 5 is a schematic diagram illustrating a method for controlling an exposure level of a frame, according to another embodiment of the present invention. Comparing with the embodiment in FIG. 3, the integration time is updated for each frame in FIG. 5, rather than update for only part of the frames in FIG. 3. As shown in FIG. 5, the integration time for each frame is updated. However, the integration time for each frame is generated according to a frame previous to it for N frames (N1). For example, the integration time IN2, which is generated from the frame 1 is applied to the frame 3. Also, the integration time INb, which is generated from the frame 2 is applied to the frame 4.

Such operation can be summarized as: the step (c), which is recited in the description of FIG. 3, further determines a third integration time (ex. INb) via the desired exposure level for the third frame (ex. frame 3 in FIG. 5). The method for controlling an exposure level of a frame wherein the method further comprises: (e) computing a desired exposure level for a fourth frame(ex. frame 4 in FIG. 5) following the third frame, and determining a fourth integration time (ex. IN3) for the pixel array via the desired exposure level, and computing a desired total gain for the fourth frame via comparing the desired exposure level with the third integration time (ex. INb), and determining a fourth analog gain(ex. AG4)and a fourth digital gain (ex. DG4) via the desired total gain; (f) applying the fourth analog gain to the amplifier to amplify at least one fourth light sensing signal from the fourth frame, and applying the fourth digital gain to the digital gain unit to amplify at least one digital light sensing signal generated from the fourth light sensing signal, and applying the third integration time (ex. INb) to the pixel array to generate the fourth light sensing signal from the fourth frame.

Figure 6:
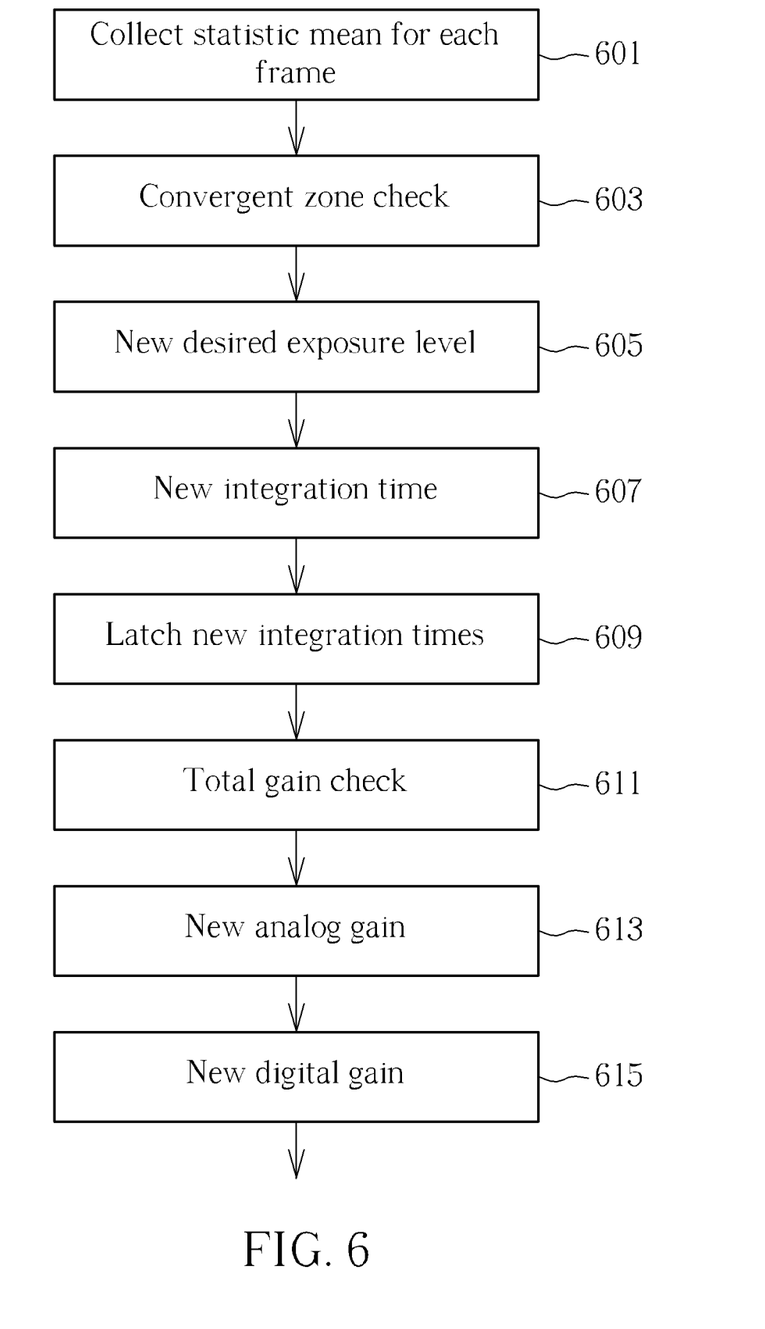
FIG. 6 is a flowchart illustrating detail steps for the method for controlling an exposure level of a frame, according to the embodiment described in FIG. 5.

FIG. 6 is a flow chart illustrating detail steps for the method for controlling an exposure level of a frame, according to the embodiment described in FIG. 5. FIG. 6 comprises the following steps:

Step 601

Collect statistic mean for each frame.

Many methods can be applied to calculate the mean. For example, pixels values for apart or a whole frame can be summed and an average thereof is calculated. Alternatively, a frame can be separated for several blocks, and each block is set a weight value. The pixel values for each block are multiplied with a weighted value to generate a plurality of weighted pixel values, and these weighted pixel values are summed and an average thereof is calculated.

Step 603

Check if the mean is within the convergent zone. If not, the steps 605-615 are performed. If yes, the new integration time, the new analog gain and the new digital gain may not be generated.

Step 605

Calculate a new desired exposure level.

In one embodiment, the new desired exposure level for a frame N+1=M * the exposure level of a frame N. The parameter M, which is a positive real number, can be determined by comparing the given target mean with the mean of the frame N. For example, M=target mean/the mean of the frame N. The frame N+1 is a frame following the frame N. Take FIG. 5 for example, frame 3 is the frame N+1 if frame 2 is the frame N.

Step 607

Decide a new integration time according to the new desired exposure level.

The new integration time will be applied to at least one later frame, but not limited to the frame N+1.

Many methods can be applied to determine the integration time. In one embodiment, the integration time is determined prior to the analog gain and the digital gain. Also, if the light source receives the alternating current and periodically changes corresponding to the alternating current, the integration time can be M*alternating period, as above-mentioned. In some applications, if the minimum frame rate is specified in advance, the integration time should be shorter than the time period defied by the frame rate.

Step 609

Latch new integration times.

In one embodiment, the exposure decision module calculates a new integration time every frame. The calculated integration time of each frame is then stored in a buffer, and will be applied to the sensor after a determined waiting number of frames. However, such step can be removed for this embodiment.

Step 611

Compute a new desired total gain and perform a total gain check operation to adjust the new desired total gain. The total gain check operation is performed to avoid gain oscillation.

In one embodiment, the new desired total gain for the frame N+1=the new desired exposure level for the frame N+1/the integration time for the frame N+1. The new desired exposure level for the frame N+1 is decided at step 605.

Step 613

Decide a new analog gain.

The new analog gain can be determined by the new desired total gain. As above-mentioned, the new desired total gain=new analog gain * new digital gain. In one embodiment, the new analog gain is determined prior to the new digital gain.

Step 615

Decide a new digital gain.

In one embodiment, the new digital gain=the new desired total gain/the new analog gain.

In one embodiment, a computer readable recording media storing at least one program is provided. The above-mentioned methods can be performed while executing the program. Also, in the embodiments the above-mentioned methods are applied to the image sensor illustrated in FIG. 1, but not limited.

The above-mentioned embodiments can be applied to an image processing system comprises an image senor and a control unit illustrated in FIG. 1, but not limited. Therefore, an image processing system according to one embodiment of the present invention can be summarized as: an image processing system comprising a control unit (ex. 109) and an image sensor (ex. 100). The image sensor 100 comprises: a pixel array (ex. 101), for generating at least one first light sensing signal from a first frame according to a first integration time; an amplifier (ex. 105), for amplifying the first light sensing signal according to a first analog gain; and a digital gain unit (ex. 107), for amplifying at least one digital light sensing signal generated according to the first light sensing signal according to a first digital gain. The control unit performs the following steps: (a) computing a desired exposure level for a second frame(ex. frame 2 in FIG.3) following the first frame, and determining a second integration time (ex. IN2) for the pixel array via the desired exposure level, and computing a desired total gain for the second frame via comparing the desired exposure level with the first integration time, and determining a second analog gain (ex. AG2) for the amplifier and a second digital gain (ex. DG2) for the digital gain unit via the desired total gain; (b) applying the second analog gain (ex. AG2) to the amplifier to amplify at least one second light sensing signal from the second frame, applying the second digital gain (ex. DG2) to the digital gain unit to amplify at least one digital light sensing signal generated from the second light sensing signal, wherein the pixel array generates the second light sensing signal according to the first integration time (ex. IN1); (c) computing a desired exposure level for a third frame (ex. frame 3 in FIG. 3) following the second frame for N frames (N≥1), and computing a desired total gain for the third frame via comparing the desired exposure level with the second integration time (ex. IN2), and determining a third analog gain (ex. AG3) and a third digital gain (ex. DG3) via the desired total gain; and (d) applying the third analog gain (ex. AG3) to the amplifier to amplify at least one third light sensing signal from the third frame, applying the third digital gain (ex. DG3) to the digital gain unit to amplify at least one digital light sensing signal generated from the third light sensing signal, and applying the second integration time (ex. IN2) to the pixel array to generate the third light sensing signal from the third frame.

Other detail operations for the image processing system can be acquired in view of above-mentioned embodiments, thus are omitted for brevity here.

In view of above-mentioned embodiments, the analog gain/digital gains are updated for each frame. Furthermore, the integration time can also be updated for each frame if desired. Thus, the issue for the prior art can be solved. Moreover, the variation of the analog gain/digital gain can be reduced since a total gain check operation is performed. By this way, a gain oscillation problem can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling an exposure level of a frame, applied to an image sensor, wherein the image sensor comprises a pixel array, an amplifier and a digital gain unit, wherein the pixel array generates at least one first light sensing signal from a first frame according to a first integration time, where the amplifier amplifies the first light sensing signal according to a first analog gain, and the digital gain unit amplifies at least one digital light sensing signal generated according to the first light sensing signal according to a first digital gain, wherein the method comprises:
    (a) computing a desired exposure level for a second frame following the first frame, and determining a second integration time for the pixel array via the desired exposure level, and computing a desired total gain for the second frame via comparing the desired exposure level with the first integration time, and determining a second analog gain for the amplifier and a second digital gain for the digital gain unit via the desired total gain;
    (b) applying the second analog gain to the amplifier to amplify at least one second light sensing signal from the second frame, applying the second digital gain to the digital gain unit to amplify at least one digital light sensing signal generated from the second light sensing signal, wherein the pixel array generates the second light sensing signal according to the first integration time;
    (c) computing a desired exposure level for a third frame following the second frame for N frames, and computing a desired total gain for the third frame via comparing the desired exposure level with the second integration time, and determining a third analog gain and a third digital gain via the desired total gain; and
    (d) applying the third analog gain to the amplifier to amplify at least one third light sensing signal from the third frame, applying the third digital gain to the digital gain unit to amplify at least one digital light sensing signal generated from the third light sensing signal, and applying the second integration time to the pixel array to generate the third light sensing signal from the third frame;
    wherein the N is a positive integer.

2. The method of claim 1, wherein the N=1.

3. The method of claim 1, wherein the step (c) further comprises:
    (e) computing the second total gain according to the second analog gain and the second digital gain; and
    (f) performing a total gain check operation to adjust the desired total gain according to a difference or a ratio between the second total gain and the desired total gain before determining the third analog gain and the third digital gain.

4. The method of claim 3, wherein the image sensor applies a rolling shutter structure.

5. The method of claim 3, further comprising:
    performing the steps (e)-(f) if a frame rate of the image sensor is larger than a predetermined threshold.

6. The method of claim 1, further comprising:
    (e) computing a desired exposure level for a fourth frame following the third frame, and determining a third integration time for the pixel array via the desired exposure level, and computing a desired total gain for the fourth frame via comparing the desired exposure level with the second integration time, and determining a fourth analog gain and a fourth digital gain via the desired total gain;
    (f) applying the fourth analog gain to the amplifier to amplify at least one fourth light sensing signal from the fourth frame, and applying the fourth digital gain to the digital gain unit to amplify at least one digital light sensing signal generated from the fourth light sensing signal, wherein the pixel array generates the fourth light sensing signal according to the second integration time;
    and the step (e) further comprises:
    (g) computing the third total gain according to the third analog gain and the third digital gain;
    (h) performing a total gain check operation to adjust the desired total gain according to a difference or a ratio between the third total gain and the desired total gain before determining the fourth analog gain and the fourth digital gain.

7. The method of claim 1, wherein the step (c) further determines a third integration time via the desired exposure level, wherein the method further comprises:
    (e) computing a desired exposure level for a fourth frame following the third frame, and determining a fourth integration time for the pixel array via the desired exposure level, and computing a desired total gain for the fourth frame via comparing the desired exposure level with the third integration time, and determining a fourth analog gain and a fourth digital gain via the desired total gain; and
    (f) applying the fourth analog gain to the amplifier to amplify at least one fourth light sensing signal from the fourth frame, and applying the fourth digital gain to the digital gain unit to amplify at least one digital light sensing signal generated from the fourth light sensing signal, and applying the third integration time to the pixel array to generate the fourth light sensing signal from the fourth frame.

8. A computer readable recoding media storing at least one non-transitory program, wherein a method for controlling an exposure level of a frame, which is applied to an image sensor, is performed if the program is execute, wherein the image sensor comprises a pixel array, an amplifier and a digital gain unit, wherein the pixel array generates a first light sensing signal from a first frame according to a first integration time, where the amplifier amplifies the first light sensing signal according to a first analog gain, and the digital gain unit amplifies a digital light sensing signal generated according to the first light sensing signal according to a first digital gain, wherein the method comprises:
 (a) computing a desired exposure level for a second frame following the first frame, and determining a second integration time for the pixel array via the desired exposure level, and computing a desired total gain for the second frame via comparing the desired exposure level with the first integration time, and determining a second analog gain for the amplifier and a second digital gain for the digital gain unit via the desired total gain;
 (b) applying the second analog gain to the amplifier to amplify at least one second light sensing signal from the second frame, applying the second digital gain to the digital gain unit to amplify at least one digital light sensing signal generated from the second light sensing signal, wherein the pixel array generates the second light sensing signal according to the first integration time;
 (c) computing a desired exposure level for a third frame following the second frame for N frames, and computing a desired total gain for the third frame via comparing the desired exposure level with the second integration time, and determining a third analog gain and a third digital gain via the desired total gain; and
 (d) applying the third analog gain to the amplifier to amplify at least one third light sensing signal from the third frame, applying the third digital gain to the digital gain unit to amplify at least one digital light sensing signal generated from the third light sensing signal, and applying the second integration time to the pixel array to generate the third light sensing signal from the third frame;
wherein the N is a positive integer.

9. The computer readable recoding media of claim 8, wherein the N=1.

10. The computer readable recoding media of claim 8, wherein the step (c) of the method further comprises:
 (e) computing the second total gain according to the second analog gain and the second digital gain; and
 (f) performing a total gain check operation to adjust the desired total gain according to a difference or a ratio between the second total gain and the desired total gain before determining the third analog gain and the third digital gain.

11. The computer readable recoding media of claim 10, wherein the image sensor applies a rolling shutter structure.

12. The computer readable recoding media of claim 10, wherein the method further comprises:
 performing the steps (e)-(f) if a frame rate of the image sensor is larger than a predetermined threshold.

13. The computer readable recoding media of claim 8, wherein the method further comprises:
 (e) computing a desired exposure level for a fourth frame following the third frame, and determining a third integration time for the pixel array via the desired exposure level, and computing a desired total gain for the fourth frame via comparing the desired exposure level with the second integration time, and determining a fourth analog gain and a fourth digital gain via the desired total gain;
 (f) applying the fourth analog gain to the amplifier to amplify at least one fourth light sensing signal from the fourth frame, and applying the fourth digital gain to the digital gain unit to amplify at least one digital light sensing signal generated from the fourth light sensing signal, wherein the pixel array generates the fourth light sensing signal according to the second integration time;
and the step (e) of the method further comprises:
 (g) computing the third total gain according to the third analog gain and the third digital gain;
 (h) performing a total gain check operation to adjust the desired total gain according to a difference or a ratio between the third total gain and the desired total gain before determining the fourth analog gain and the fourth digital gain.

14. The computer readable recoding media of claim 8, wherein the step (c) of the method further determines a third integration time via the desired exposure level, wherein the method further comprises:
 (e) computing a desired exposure level for a fourth frame following the third frame, and determining a fourth integration time for the pixel array via the desired exposure level, and computing a desired total gain for the fourth frame via comparing the desired exposure level with the third integration time, and determining a fourth analog gain and a fourth digital gain via the desired total gain; and
 (f) applying the fourth analog gain to the amplifier to amplify at least one fourth light sensing signal from the fourth frame, and applying the fourth digital gain to the digital gain unit to amplify at least one digital light sensing signal generated from the fourth light sensing signal, and applying the third integration time to the pixel array to generate the fourth light sensing signal from the fourth frame.

15. An image processing system, comprising:
 an image sensor, comprising:
  a pixel array, for generating at least one first light sensing signal from a first frame according to a first integration time;
  an amplifier, for amplifying the first light sensing signal according to a first analog gain; and
  a digital gain unit, for amplifying at least one digital light sensing signal generated according to the first light sensing signal according to a first digital gain; and
 a control unit, having functions of:
  (a) computing a desired exposure level for a second frame following the first frame, and determining a second integration time for the pixel array via the desired exposure level, and computing a desired total gain for the second frame via comparing the desired exposure level with the first integration time, and determining a second analog gain for the amplifier and a second digital gain for the digital gain unit via the desired total gain;
  (b) applying the second analog gain to the amplifier to amplify at least one second light sensing signal from the second frame, applying the second digital gain to the digital gain unit to amplify at least one digital light sensing signal generated from the second light sensing signal, wherein the pixel array generates the second light sensing signal according to the first integration time;
  (c) computing a desired exposure level for a third frame following the second frame for N frames, and computing a desired total gain for the third frame via comparing the desired exposure level with the second integration time, and determining a third analog gain and a third digital gain via the desired total gain; and (d) applying the third analog gain to the amplifier to amplify at least one third light sensing signal from the third frame, applying the third digital gain to the digital gain unit to amplify at least one digital light sensing signal generated from the third light sensing signal, and applying the second integration time to the pixel array to generate the third light sensing signal from the third frame;

wherein the N is a positive integer.

16. The image processing system of claim 15, wherein the N=1.

17. The image processing system of claim 15, wherein the function (c) further comprises:

(e) computing the second total gain according to the second analog gain and the second digital gain; and (f) performing a total gain check operation to adjust the desired total gain according to a difference or a ratio between the second total gain and the desired total gain before determining the third analog gain and the third digital gain.

18. The image processing system of claim 17, wherein the image sensor applies a rolling shutter structure.

19. The image processing system of claim 17, wherein the control unit further performs:

performing the steps (e)-(f) if a frame rate of the image sensor is larger than a predetermined threshold.

20. The image processing system of claim 15, wherein the control unit further has functions of:

(e) computing a desired exposure level for a fourth frame following the third frame, and determining a third integration time for the pixel array via the desired exposure level, and computing a desired total gain for the fourth frame via comparing the desired exposure level with the second integration time, and determining a fourth analog gain and a fourth digital gain via the desired total gain;

(f) applying the fourth analog gain to the amplifier to amplify at least one fourth light sensing signal from the fourth frame, and applying the fourth digital gain to the digital gain unit to amplify at least one digital light sensing signal generated from the fourth light sensing signal, wherein the pixel array generates the fourth light sensing signal according to the second integration time;

and the function (e) further comprises:

(g) computing the third total gain according to the third analog gain and the third digital gain;

(h) performing a total gain check operation to adjust the desired total gain according to a difference or a ratio between the third total gain and the desired total gain before determining the fourth analog gain and the fourth digital gain.

21. The image processing system of claim 15, wherein the function (c) further determines a third integration time via the desired exposure level, wherein the control unit further has functions of:

(e) computing a desired exposure level for a fourth frame following the third frame, and determining a fourth integration time for the pixel array via the desired exposure level, and computing a desired total gain for the fourth frame via comparing the desired exposure level with the third integration time, and determining a fourth analog gain and a fourth digital gain via the desired total gain; and (f) applying the fourth analog gain to the amplifier to amplify at least one fourth light sensing signal from the fourth frame, and applying the fourth digital gain to the digital gain unit to amplify at least one digital light sensing signal generated from the fourth light sensing signal, and applying the third integration time to the pixel array to generate the fourth light sensing signal from the fourth frame.

* * * * *